United States Patent
Murkes

[11] 3,710,949
[45] Jan. 16, 1973

[54] APPARATUS FOR CONTINUOUSLY SEPARATING A SLUDGE-CONTAINING MIXTURE OF TWO LIQUIDS

[75] Inventor: Jakob Murkes, Bandhagen, Sweden
[73] Assignee: Alfa-Laval AB, Tumba, Sweden
[22] Filed: Oct. 8, 1970
[21] Appl. No.: 79,056

[30] Foreign Application Priority Data
Nov. 5, 1969 Sweden..................15138/69

[52] U.S. Cl................................210/522
[51] Int. Cl..............................B01d 21/00
[58] Field of Search..........210/521, 522, 519, 83, 84

[56] References Cited

UNITED STATES PATENTS

| 3,482,694 | 12/1969 | Rice et al. | 210/84 X |
| 2,747,736 | 5/1956 | Mobley | 210/521 X |
| 3,543,933 | 12/1970 | Karter | 210/83 X |
| 2,207,399 | 7/1940 | Gaertner | 210/521 X |

FOREIGN PATENTS OR APPLICATIONS

| 578,205 | 6/1946 | Great Britain | 210/521 |
| 74,761 | 3/1949 | Norway | 210/521 |

Primary Examiner—Reuben Friedman
Assistant Examiner—Frederick F. Calvetti
Attorney—Davis, Hoxie, Faithfull & Hapgood

[57] ABSTRACT

A first chamber for static pre-separation of the mixture and a second chamber for static after-separation are located one above the other and are interconnected by a plurality of straight, substantially vertical flow channels. Each such channel has a pair of opposed walls which are spaced from each other a distance of about 1 to 5 mm. and which are preferentially wettable by the liquid (e.g., oil) dispersed in the other liquid (e.g., water), and the pre-separation chamber is provided at the bottom with a sludge outlet.

5 Claims, 1 Drawing Figure

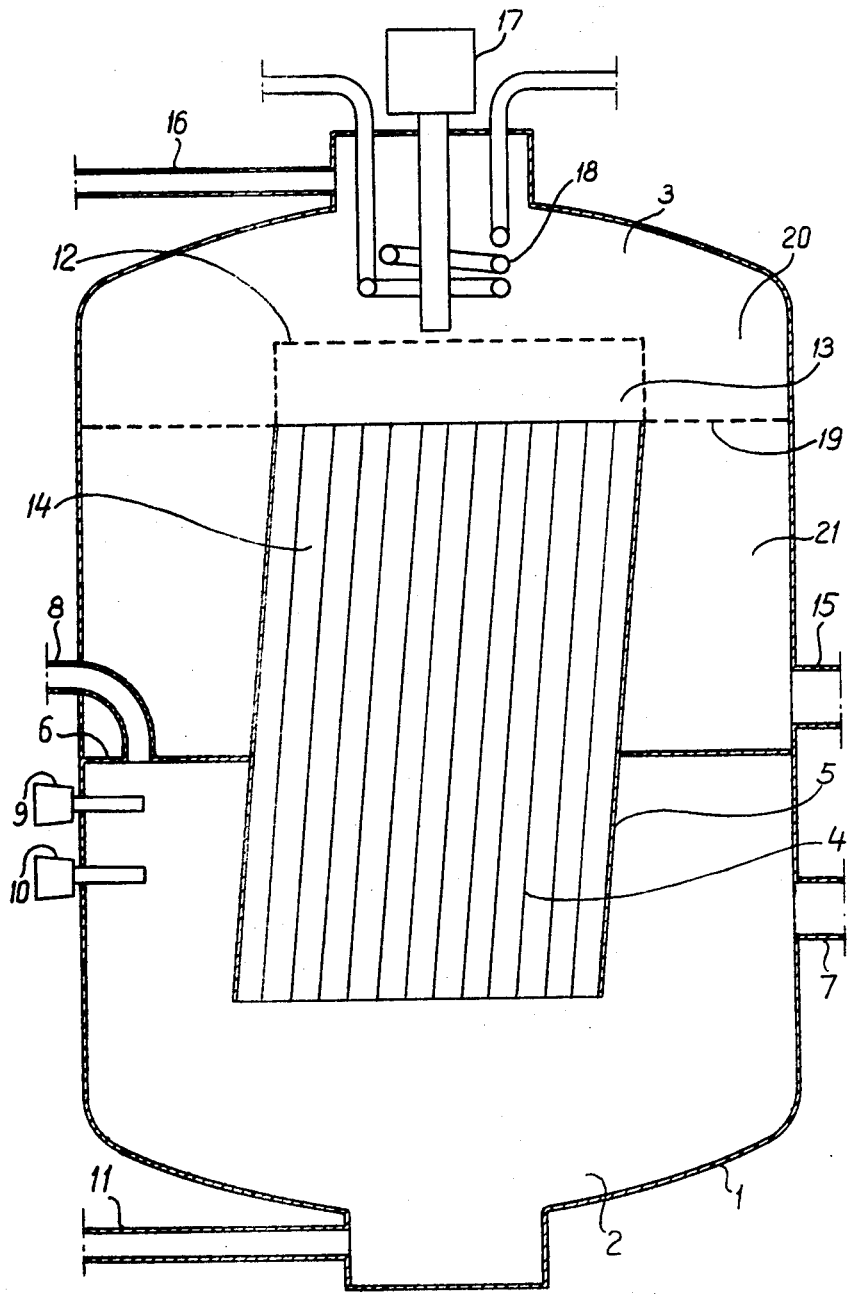

APPARATUS FOR CONTINUOUSLY SEPARATING A SLUDGE-CONTAINING MIXTURE OF TWO LIQUIDS

This invention relates to apparatus for continuously separating a sludge-containing mixture of two liquids, one of which is dispersed in the other. More particularly, the invention relates to such apparatus of the type comprising a chamber for static pre-separation of the mixture and a chamber for static after-separation, one of these chambers being located above the other.

An apparatus of this type is disclosed in Norwegian Pat. No. 74,761. This prior apparatus, however, has the disadvantages that the sludge separation takes place initially in the after-separation chamber, and the apparatus does not provide for effective coalescence of the dispersed phase of the liquid-liquid mixture.

The principal object of the present invention is to provide an improved apparatus of the type described which avoids these disadvantages.

An apparatus according to the invention comprises means forming a plurality of straight, substantially vertical flow channels interconnecting the pre-separation and after-separation chambers, each channel having a pair of opposed walls which are spaced from each other a distance of about 1 to 5 millimeters and which are preferentially wettable by the liquid forming the dispersed phase of the liquid-liquid mixture (i.e., which tend to be wetted first by the dispersed liquid rather than the other liquid). A greater spacing between the opposed walls makes the coalescence action less effective. The new apparatus also includes a sludge outlet at the bottom of the pre-separation chamber.

If the dispersed liquid has a lower specific gravity than the other liquid, the pre-separation chamber may be the lower chamber; and if the dispersed liquid has the higher specific gravity, the pre-separation chamber may be the upper chamber.

The main part of the sludge (which is assumed to have the highest specific gravity in the mixture) deposits, of course, at the bottom of the pre-separation chamber where the sludge outlet is located. This is especially true for the largest sludge particles, and for this reason only fine sludge particles can accompany the liquid into the above-mentioned flow channels. In order to prevent this fine sludge from clogging the flow channels, the latter are preferably formed by flat plates parallel to each other or by cylinders concentric to each other, since tube-like channels are more easily clogged.

The dispersed liquid droplets which are not separated in the pre-separation chamber enter the substantially vertical flow channels together with the rest of the liquid mixture, and in these channels the liquid droplets coalesce due to adhesion to the channel walls. According to another feature of the invention, the flow channels open at their outlet ends into a sub-chamber defined by a net having a mesh width of about 1 to 5 mm. When the coalesced liquid droplets reach this net, their continued passage is prevented to a certain degree by the net, so that they are collected at the net and are coalesced further, whereby even a continuous layer of the dispersed liquid phase can be formed at the net. In coalescing or in joining with this liquid layer, the dispersed liquid droplets often liberate droplets of the continuous phase enclosed in them.

In the after-separation chamber, a continued separation of the dispersed phase from the continuous phase takes place, and these two phases are discharged through respective separate outlets from the after-separation chamber. In order to prevent the dispersed liquid droplets from discharging with the continuous phase through the outlet for the latter, the after-separation chamber is preferably divided by a net into an upper sub-chamber and a lower sub-chamber, each of which has a liquid outlet. Thus, the dispersed liquid droplets are caught by the net and coalesce, whereupon they separate from the continuous liquid phase and discharge through the outlet for the dispersed liquid phase.

Fine sludge entering the flow channels may either pass through them completely or sink back to their inlet openings. To prevent this fine sludge from depositing on the channel walls, any inclination of these walls to the vertical is preferably limited so that the projection of each wall in the vertical direction covers at most the area of the inlet opening of a channel adjacent such wall.

The invention is described in more detail below with reference to the accompanying drawing, in which the single illustration is a vertical sectional view, partly in elevation, of one example of the new apparatus. In the following description, it is assumed by way of example that the mixture to be separated is a sludge-containing water, such as wash water from oil tanks or ballast water, in which oil droplets lighter than the water are dispersed.

In the drawing, a housing 1 encloses a pre-separation chamber 2 and an after-separation chamber 3 as well as a set of planar, parallel, slightly inclining plates 4 consisting of stainless steel or a plastic such as polyethylene, for example. The plates 4 (shown in edge view) are spaced from each other to form substantially vertical channels 14 interconnecting the chambers 2 and 3, the plates being surrounded and held together by walls 5. By means of these walls and a horizontal wall 6, the housing 1 is divided into the two separation chambers 2 and 3. The pre-separation chamber 2 has an inlet 7 for the mixture to be separated and an outlet 8 for oil separated in this chamber. Two electrodes 9 and 10 sense (by capacitive measuring) the level of a boundary surface between water and oil, this surface moving between the electrodes. The pre-separation chamber is provided with a bottom outlet 11 for settled sludge. A net 12 of copper or brass defines a sub-chamber 13 into which the flow channels 14 open at their upper or outlet ends. The after-separation chamber has an outlet 15 for water and fine sludge accompanying the water, and also has an outlet 16 for oil. An element 17 measures by capacitance the level variations of the boundary surface between water and oil in the chamber 3. A steam-heated tube coil 18 heats the oil layer in the after-separation chamber so as to facilitate the withdrawal of the oil through the outlet 16, if the oil is viscous. A net 19 of copper or brass divides the after-separation chamber 3 into an upper sub-chamber 20 and a lower sub-chamber 21.

In the operation of the apparatus, sludge deposits from the mixture fed in through the inlet 7 are collected at the bottom of the chamber 2 and discharged intermittently through a valve (not shown) provided in the sludge outlet 11 and opened at suitable intervals. The sludge is flushed out due to the pressure prevailing in the interior of the housing 1. A valve (not shown) inserted in the outlet 8 is opened and closed under control of the electrodes 9 and 10, whereby oil is discharged so that the thickness of the oil layer in the upper part of the chamber 2 is always kept between predetermined values. Fine sludge accompanies the water upward into the flow channels 14 and either accompanies the water through these channels and the nets 12 and 19 to the outlet 15 or sinks back through the channels 14 and is collected at the bottom of the chamber 2.

During the rise of the water through the channels, oil droplets remaining in the water collide with the channel walls and join with an oil film formed on the walls due to their capability of being wetted by oil. Enlarged oil droplets leave the upper ends of the channels 14 and are caught by the net 12, where they again form an oil layer on the upper side as well as on the underside of the net. Oil droplets not yet coalesced are caught in this layer. The oil droplets often contain, in their turn, small water droplets which give the oil droplets such a weight that they easily are kept suspended in the water without any tendency to separate from the latter. When such oil droplets join with an oil layer already formed, the enclosed water droplets are liberated and pass over to the continuous water phase. Enlarged oil droplets leave the net 12 and form an oil layer in the upper part of the chamber 3. Oil droplets which still have a tendency to accompany the water toward the outlet 15 will impinge against the net 19 and be caught by it. These oil droplets coalesce at this net in the manner already described and rise to the oil layer in the upper part of the chamber 3. Here, the element 17 senses the level of the lower boundary surface of the oil layer and actuates a valve (not shown) inserted in the outlet 16, so that the withdrawal of oil keeps said level between predetermined values. The nets 12 and 19 have the additional advantageous effect that they subdue movements of the oil layers caused by the water flow, which movements would otherwise cause a redivision of the oil into small droplets. When the apparatus is used in ships, the nets also subdue movements of the oil layers caused by the ship movements.

The chamber 3 can be used as a pre-separation chamber and the chamber 2 as an after-separation chamber when the oil has a higher specific gravity than the water, provided the apparatus as shown in the drawing is slightly modified in a manner which will be obvious from the foregoing.

I claim:

1. Apparatus for continuously separating a sludge-containing mixture of two liquids, one of said liquids being dispersed in the other and having a different specific gravity than said other, the apparatus comprising means forming a first chamber for static pre-separation of said mixture and also forming a second chamber for static after-separation of part of said mixture, one of said chambers being located above the other, and means forming a plurality of straight, substantially vertical flow channels interconnecting said chambers, each channel having a pair of opposed walls which are spaced from each other a distance of about 1 to 5 mm. and which are preferentially wettable by said dispersed liquid, said first chamber having a sludge outlet at the bottom thereof and an inlet for said mixture, said first chamber also having an outlet for one of said liquids and which is separate from said sludge outlet and said flow channels, said second chamber having separate outlets for said two liquids, respectively.

2. Apparatus according to claim 1, comprising also a net defining a sub-chamber into which said channels open at their outlet ends, said net having a mesh width of about 1 to 5 mm.

3. Apparatus according to claim 1, in which said channel-forming means comprise a plurality of flat plates disposed in parallel spaced relation to each other.

4. Apparatus according to claim 1, comprising also a net dividing said second chamber into upper and lower sub-chambers, each of said sub-chambers having a separate liquid outlet.

5. Apparatus according to claim 1, in which said channel walls are inclined, the maximum inclination of each wall being such that its projection in the vertical direction covers the area of the inlet opening of a channel adjacent said wall.

* * * * *